(12) United States Patent
Shimosato et al.

(10) Patent No.: US 7,627,225 B2
(45) Date of Patent: Dec. 1, 2009

(54) IMAGE CAPTURING DEVICE AND IMAGE CAPTURING METHOD

(75) Inventors: Hideto Shimosato, Nagano (JP); Kazuo Nomura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 565 days.

(21) Appl. No.: 11/448,729

(22) Filed: Jun. 8, 2006

(65) Prior Publication Data

US 2006/0280429 A1    Dec. 14, 2006

(30) Foreign Application Priority Data

Jun. 10, 2005   (JP)  .............. 2005-170460

(51) Int. Cl.
- *G11B 27/00* (2006.01)
- *H04N 5/93* (2006.01)
- *H04N 5/228* (2006.01)
- *G03B 17/00* (2006.01)

(52) U.S. Cl. .................. 386/52; 348/208.2; 348/208.4; 396/52

(58) Field of Classification Search ........................ 348/208.99–208.16; 396/52–55
See application file for complete search history.

(56) References Cited

U.S. PATENT DOCUMENTS

| | | | | |
|---|---|---|---|---|
| 7,176,962 | B2* | 2/2007 | Ejima ...................... | 348/208.4 |
| 7,315,324 | B2* | 1/2008 | Cleveland et al. ......... | 348/208.4 |
| 7,432,953 | B2* | 10/2008 | Washisu ................... | 348/208.5 |
| 2005/0122403 | A1* | 6/2005 | Yoneda .................... | 348/208.6 |
| 2005/0128312 | A1* | 6/2005 | Fredlund et al. ......... | 348/222.1 |
| 2005/0185058 | A1* | 8/2005 | Sablak ................... | 348/208.99 |

FOREIGN PATENT DOCUMENTS

JP     11-088810 A     3/1999

* cited by examiner

*Primary Examiner*—Lin Ye
*Assistant Examiner*—Pritham Prabhakher
(74) *Attorney, Agent, or Firm*—Sughrue Mion, PLLC

(57) ABSTRACT

An image capturing device includes an image capturer, operable to perform a first image capturing of an object image so as to generate first image data corresponding to a first time period shorter than a predetermined time period, and operable to perform a second image capturing of the object image so as to generate second image data corresponding to a second time period shorter than the predetermined time period, a storage, adapted to store the first image data and the second image data, and an image generator, operable to generate image data corresponding to the predetermined time period based on the first image data and the second image data.

9 Claims, 7 Drawing Sheets

FIG. 4

| SAMPLE NO. | GYRO DATA | | VSYNC MARK | HAND-SHAKING MARK | |
|---|---|---|---|---|---|
| | Y AXIS | X AXIS | | | |
| 331 | 1539 | 1518 | 1 | | ↑ FIRST CAPTURING OF FIRST STILL IMAGE |
| 332 | 1546 | 1518 | 0 | | |
| 333 | 1558 | 1521 | 0 | | |
| 334 | 1566 | 1530 | 0 | | |
| ... | | | | | |
| 346 | 1660 | 1501 | 0 | | ↓ |
| 347 | 1661 | 1502 | 0 | NG | |
| 348 | 1663 | 1498 | 0 | | |
| ... | | | | | |
| 370 | 1660 | 1501 | 0 | | ↑ RE-CAPTURING OF FIRST STILL IMAGE / SECTION FOR INTEGRATING GYRO DATA |
| 371 | 1661 | 1502 | 1 | | |
| 372 | 1663 | 1498 | 0 | | |
| ... | | | | | |
| 385 | 1660 | 1501 | 0 | | ↓ |
| 386 | 1661 | 1502 | 0 | OK | |
| 387 | 1663 | 1498 | 0 | | |
| ... | | | | | |
| 410 | 1660 | 1501 | 0 | | ↑ FIRST CAPTURING OF SECOND STILL IMAGE |
| 411 | 1660 | 1501 | 1 | | |
| 412 | 1663 | 1498 | 0 | | |
| ... | | | | | |
| 425 | 1660 | 1501 | 0 | | ↓ |
| 426 | 1661 | 1502 | 0 | OK | |
| 427 | 1663 | 1498 | 0 | | |

IMAGE CAPTURING DEVICE AND IMAGE CAPTURING METHOD

BACKGROUND OF THE INVENTION

The present invention relates to an image capturing device and method.

JP-A-11-88810 has disclosed an electronic camera. This electronic camera has a vibration detection means for detecting vibration of a body of the camera, a shutter speed detection means for detecting the speed of a shutter of the camera, and a warning output means for issuing a warning of hand-shaking in accordance with the output of the vibration detection means. When hand-shaking occurs at the time of capturing an image, a warning is issued to urge a user to capturecapture the image again.

The electronic camera disclosed in JP-A-11-88810 cannot reduce the influence of hand-shaking at the time of capturing an image.

SUMMARY

It is therefore an object of the invention to provide a device and method for capturing a still image free from the influence of shaking.

In order to achieve the object, according to the invention, there is provided an image capturing device comprising:

an image capturer,
  operable to perform a first image capturing of an object image so as to generate first image data corresponding to a first time period shorter than a predetermined time period, and
  operable to perform a second image capturing of the object image so as to generate second image data corresponding to a second time period shorter than the predetermined time period;
a storage, adapted to store the first image data and the second image data; and
an image generator, operable to generate image data corresponding to the predetermined time period based on the first image data and the second image data.

A sum of the first time period and the second time period may be shorter than the predetermined time period.

The image capturing device may further include a detector, operable to detect movement of the image capturer and to generate movement data based on the detected movement, the first time period may be defined from a first time point to a second time point, the second time period may be defined from a third time point to a fourth time point, and the image generator may generate third image data by superposing the first image data and the second image data based on the movement data corresponding to a third time period defined between the first time point and the third time point, and the image data may be generated based on the third image data.

The first image data may include first pixel information, the second image data may include second pixel information, and the image generator may generate pixel information of the image data based on the first pixel information and the second pixel information.

The first time period may be different from the second time period, the first pixel information may be associated with the second pixel information via a predetermined correlation, and the pixel information of the image data may be determined based on the predetermined correlation.

The image capturing device may further includes a controller, operable to: detect movement of the image capturer and to generate movement data based on the detected movement; detect shaking of the image capture in a case where the movement data indicates that the movement is no less than a predetermined value; and cause the image capturer to perform a third image capturing of the object image so as to generate third image data corresponding to a third time period, length of which is identical with that of the first time period, in a case where the shaking of the image capturer is detected.

The storage may be adapted to store the movement data, the third time period may be defined from a first time point to a second time point, the second time period may be defined from a third time point to a fourth time point, and the image generator may generate fourth image data by superposing the third image data and the second image data based on the stored movement data corresponding to a fourth time period defined between the first time point and the third time point, and the image data may be generated based on the fourth image data.

The storage may be adapted to store the movement data in association with timing data based on the first time point and the third time point and shaking data based on the shaking of the image capturer.

The image capturing device may further include a determiner, operable to determine the predetermined time period based on the object image; a switch; and a controller, operable to cause the determiner to determine the predetermined time period after the switch is operated.

In order to achieve the object, according to the invention, there is also provided an image capturing method comprising:

performing a first image capturing of an object image so as to generate first image data corresponding to a first time period shorter than a predetermined time period;

performing a second image capturing of the object image so as to generate second image data corresponding to a second time period shorter than the predetermined time period after the first image capturing; and generating the image data based on the first image data and the second image data.

BRIEF DESCRIPTION OF THE DRAWINGS

FIG. 4 is an explanatory view showing an example of the data structure of gyro log data.

DETAIL DESCRIPTION OF PREFERRED EMBODIMENTS

Figure 1:
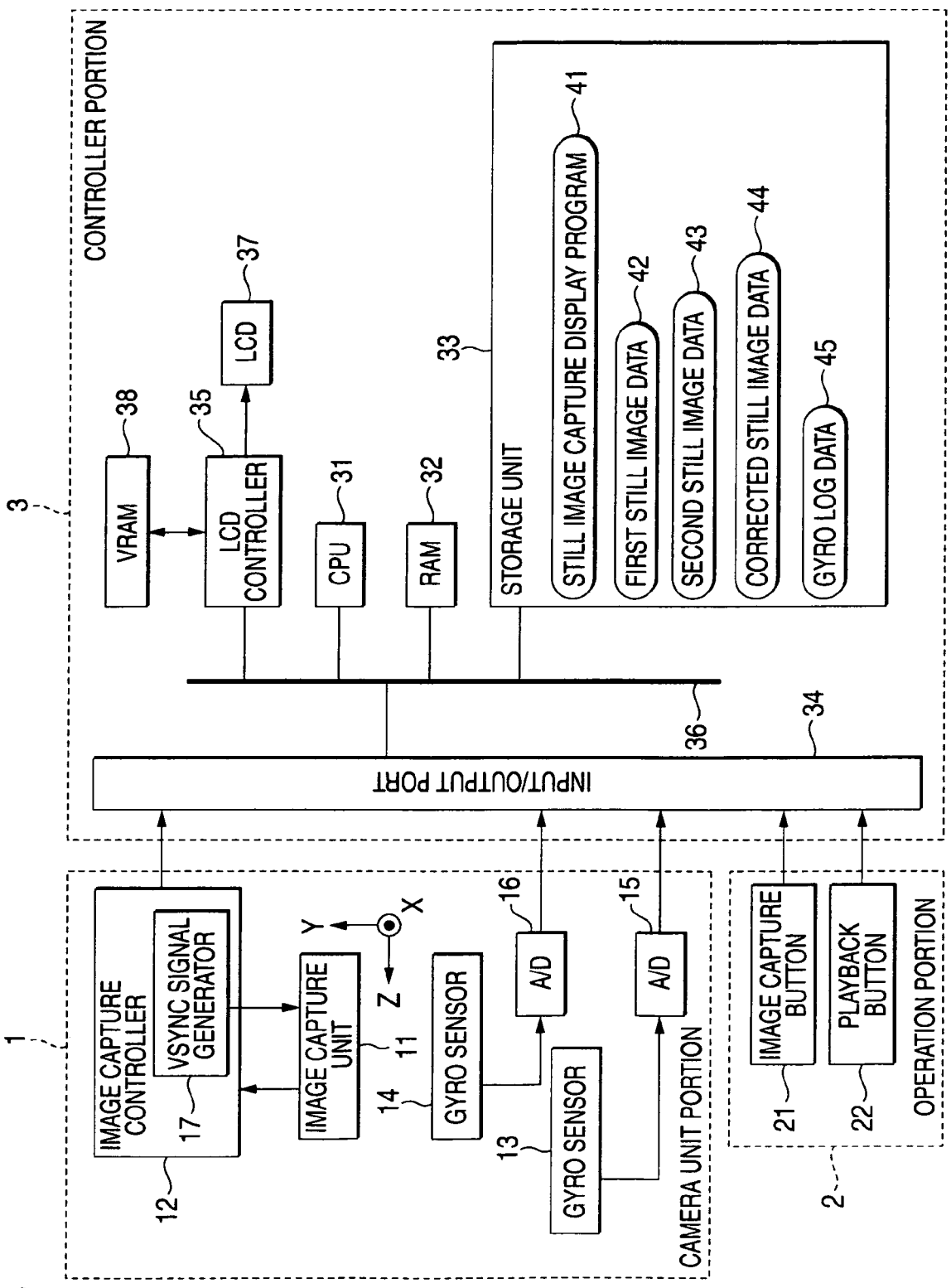
FIG. 1 is a block diagram showing the configuration of an image capturing device according to an embodiment of the invention.

An image capturing device and method according to an embodiment of the invention will be described below with reference to the drawings (FIGS. 1 to 8).

The image capturing device is a portable image capturing device such as a camera-containing portable phone or a video camera. The image capturing device has a camera unit portion 1, an operation portion 2, and a controller portion 3. The image capturing device captures a still image in the image capture mode and displays the still image in the playback mode.

The camera unit portion 1 has an image capture unit 11, an image capture controller 12, two gyro sensors 13 and 14 movement, and two A/D (Analog to Digital) converters 15 and 16 movement. The camera unit portion 1 is fixed in a housing not shown but provided for the image capturing device.

The image capture unit 11 is a photo acceptance device such as a CCD (Charge-Coupled Device) or a CMOS (Complementary Metal-Oxide Semiconductor). The image capture unit 11 has a plurality of photo acceptance elements.

The plurality of photo acceptance elements are arranged two-dimensionally on a plane perpendicular to an optical axis X of the image capture unit 11. In FIG. 1, directions of the two-dimensional arrangement of the plurality of photo acceptance elements represent a Y axis and a Z axis respectively. An optical unit not shown is disposed in the X axis direction so as to be put on the image capture unit 11. The optical unit includes lenses, etc. An image of an object based on light incident on the optical unit is projected on the image capture unit 11.

Each photo acceptance element outputs a level signal in accordance with the intensity of light received by the photo acceptance element. When a reset signal is input to the photo acceptance element, the level signal output by the photo acceptance element is reset to an initial level. The level signal output by the photo acceptance element changes in accordance with increase in the intensity of light received after the reset signal is input to the photo acceptance element.

The image capture controller 12 is connected to the image capture unit 11. The image capture controller 12 has a VSYNC (Vertical Synchronizing) signal generator 17. The image capture controller 12 controls the image capture unit 11. The VSYNC signal generator 17 outputs a VSYNC signal with pulses generated at regular intervals, for example, of one thirtieth second.

The image capture controller 12 controls the image capture unit 11 to capture a still image on the basis of the VSYNC signal provided as a reference timing signal. The image capture controller 12 generates frame image data for forming one frame image on the basis of the respective level signals given from the photo acceptance elements of the image capture unit 11.

Specifically, when, for example, the VSYNC signal is detected, the image capture controller 12 classifies the plurality of photo acceptance elements into groups in accordance with a predetermined number of lines based on the two-dimensional arrangement of the plurality of photo acceptance elements and outputs reset signals to the groups successively at time intervals. When a predetermined exposure time period has lapsed since the output of each reset signal, the image capture controller 12 reads the level signals of the plurality of photo acceptance elements of the groups to which the reset signals have been output by the image capture controller 12. The image capture controller 12 generates frame image data on the basis of all the read level signals of the photo acceptance elements.

For example, the frame image data generated by the image capture controller 12 has pixels equal in number to the photo acceptance elements. The pixels are arranged two-dimensionally in the same manner as the photo acceptance elements. For example, each pixel has information such as color data with three colors of R (Red), G (Green) and B (Blue). Incidentally, the color data of each pixel may be YCC data.

For example, any gyro sensor may be used as each of the two gyro sensors 13 and 14 provided in the camera unit portion 1 as long as the gyro sensor can detect an angular velocity in a predetermined direction and can output a level signal in accordance with the magnitude of the detected angular velocity. A vibration gyro sensor "XV-3500CB" or the like may be used as the gyro sensor. The vibration gyro sensor "XV-3500CB" used as an example has an outer size of 5.0 [mm]×3.2 [mm]×1.3 [mm] and a mass of 66 [mg]. When such a compact and thin vibration gyro sensor is used, the gyro sensor can be entirely disposed in a space in the housing of the image capturing device even in the case where the space is small.

One 13 of the two gyro sensors 13 and 14 detects an angular velocity due to rotational movement on the Y axis in FIG. 1. The other gyro sensor 14 detects an angular velocity due to rotational movement on the Z axis direction in FIG. 1. Accordingly, the two gyro sensors 13 and 14 detect the movement of the image capture unit 11 in the Y-axis direction and the movement of the image capture unit 11 in the Z-axis direction.

One 15 of the two A/D converters 15 and 16 is connected to one gyro sensor 13. The other A/D converter 16 is connected to the other gyro sensor 14. Any converters may be used as these A/D converters 15 and 16 as long as the converters can sample the level signals output from the gyro sensors 13 and 14. For example, the A/D converters 15 and 16 may sample the level signals at intervals of a time period which is one thirty-second of the time period of the VSYNC signal. Sampled values obtained by sampling the level signals are output as gyro data from the A/D converters 15 and 16. The sampling time period of the A/D converters 15 and 16 may be set suitably by the controller portion 3.

For example, the operation portion 2 has an image capture button 21, a playback button 22, etc. The operation portion 2 outputs input data in accordance with user's operation on the button. When, for example, the image capture button 21 is operated, the operation portion 2 outputs input data for giving an instruction to start the image capture mode. When, for example, the playback button 22 is operated, the operation portion 2 outputs input data for giving an instruction to start the playback mode.

The controller portion 3 has a CPU (Central Processing Unit) 31, an RAM (Random Access Memory) 32, a storage unit 33 as a storage means, an input/output port 34, an LCD (Liquid Crystal Display: LCD 37) controller 35, and a system bus 36. The CPU 31, the RAM 32, the storage unit 33, the input/output port 34 and the LCD controller 35 are connected to one another through the system bus 36.

The image capture controller 12 and the two A/D converters 15 and 16 in the camera unit portion 1 and the operation portion 2 are connected to the input/output port 34. The image capture controller 12 outputs frame image data to the input/output port 34. The two A/D converters 15 and 16 output gyro data to the input/output port 34. The operation portion 2 outputs input data in accordance with operation on the key to the input/output port 34.

An LCD 37 and a VRAM (Video Random Access Memory) 38 are connected to the LCD controller 35. When frame image data are supplied from the system bus 36, the LCD controller 35 stores the frame image data in the VRAM 38. The LCD controller 35 reads the frame image data from the VRAM 38 at intervals of a predetermined time period and displays an image based on the read data on the LCD 37. When there is a request to read frame image data, the LCD controller 35 reads the frame image data from the VRAM 38 and supplies the frame image data to the system bus 36.

Incidentally, the LCD controller 35 appropriately executes these processes. When, for example, the process for writing frame image data from the system bus 36 and the process for displaying the frame image data overlap each other in terms of timing, the LCD controller 35 executes these processes in order of generation. Access to the VRAM 38 can be managed exclusively by the LCD controller 35.

The storage unit 33 stores a still image capture/display program 41, first still image data 42, second still image data 43, corrected still image data 44, gyro log data 45, etc. The storage unit 33 can be formed from various kinds of semiconductor memories such as a flash memory or from an HDD (Hard Disk Drive) or the like.

Figure 2:
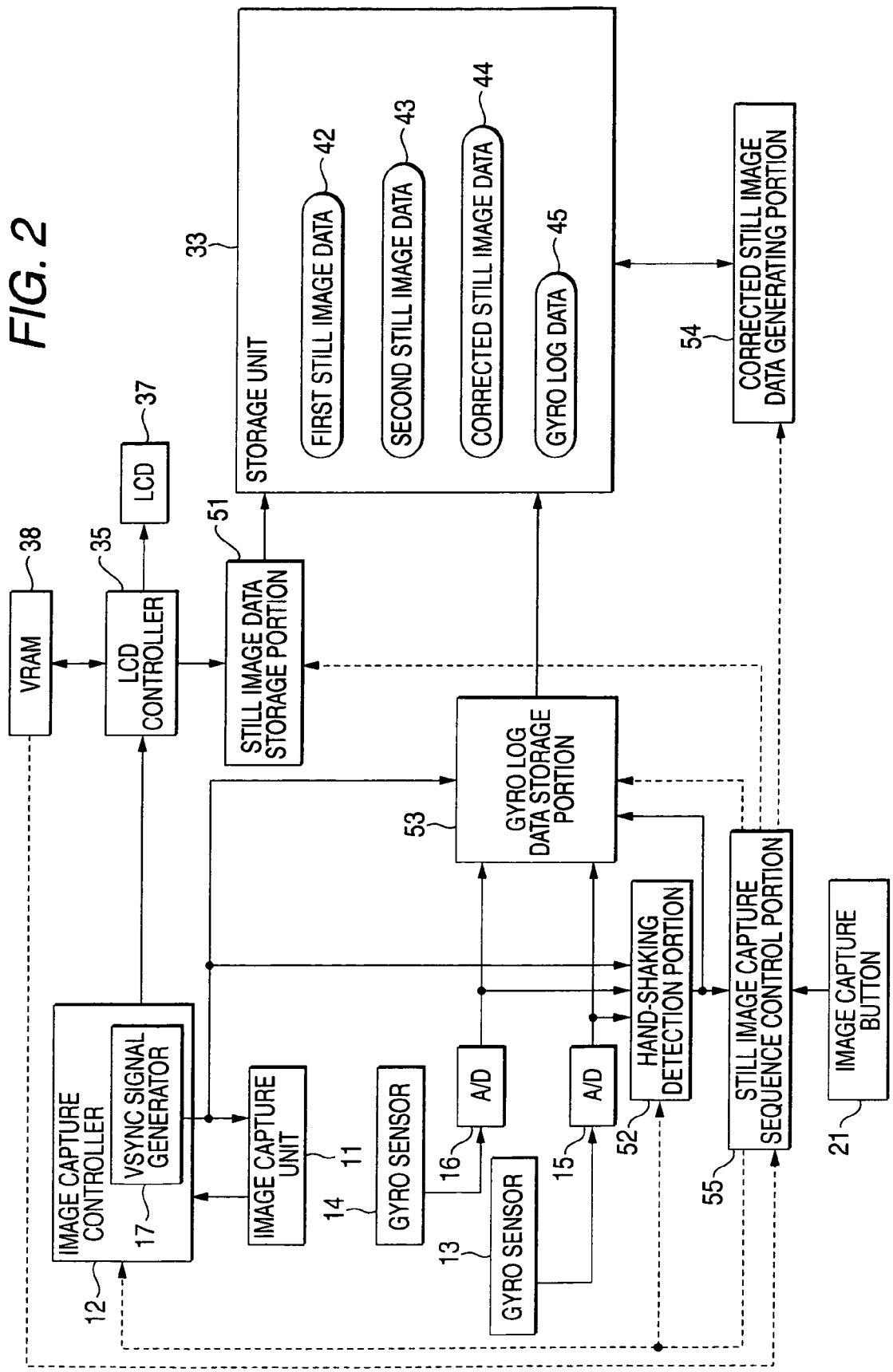
FIG. 2 is a functional block diagram of the image capturing device depicted in FIG. 1 in an image capture mode.
Figure 3:
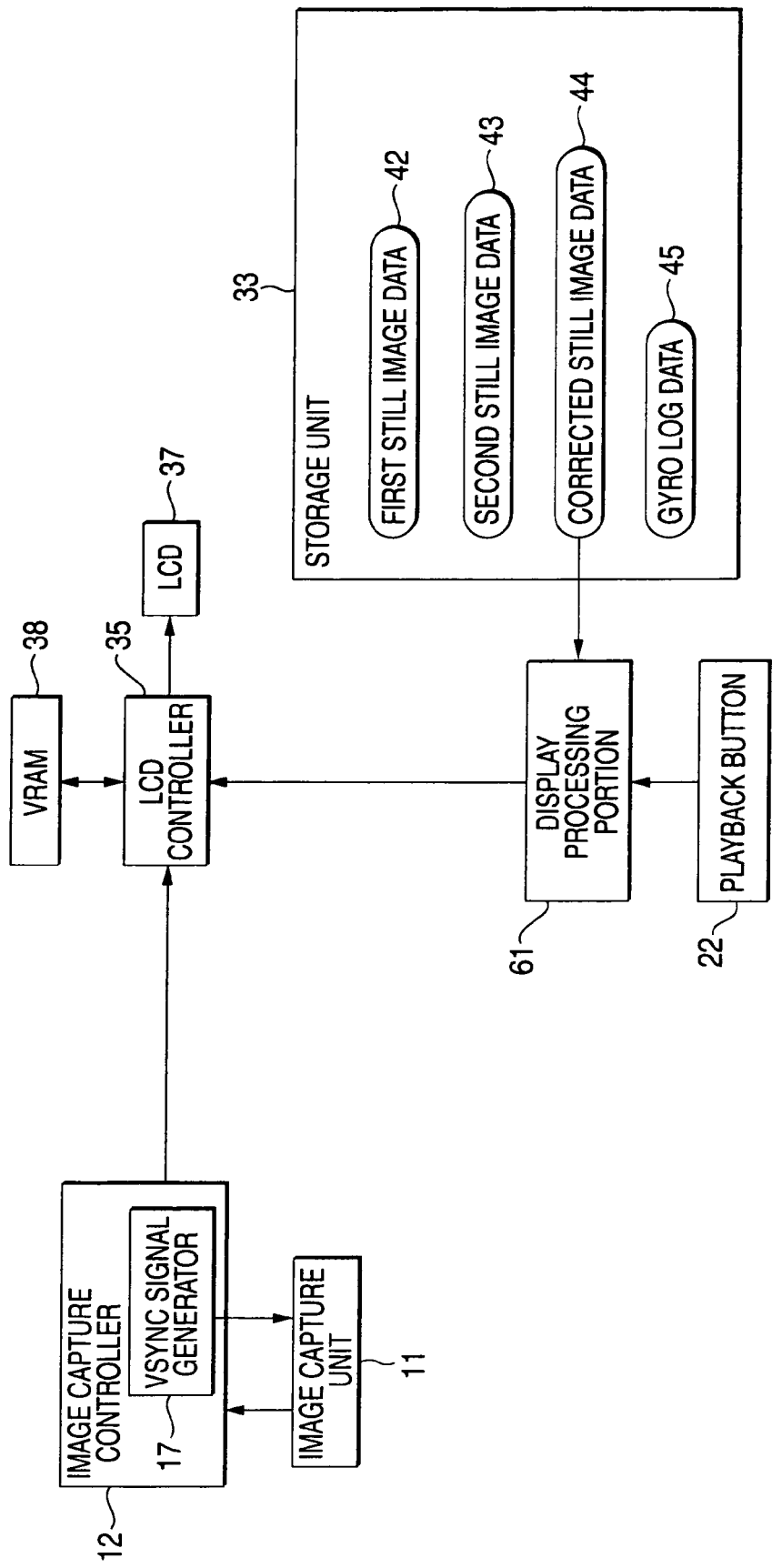
FIG. 3 is a functional block diagram of the image capturing device depicted in FIG. 1 in a playback mode.

The CPU 31 reads and executes the still image capture/display program 41 stored in the storage unit 33. As a result, a still image data storage portion 51, a hand-shaking detection portion 52, a gyro log data storage portion 53, a corrected still image data generating portion 54, a still image capture sequence control portion 55, and a display processing portion 61 are implemented in the controller portion 3. These portions 51 to 55 are shown in FIG. 2. The portion 61 is shown in FIG. 3.

Incidentally, the still image capture/display program 41 may be stored in the storage unit 33 either before shipment of the image capturing device or after shipment of the image capturing device. In the case where it is necessary to store the still image capture/display program 41 in the storage unit 33 after shipment of the image capturing device, the still image capture/display program 41 can be stored in the storage unit 33 when the still image capture/display program 41 stored in a recording medium such as a CD-ROM (Compact Disc Read Only Memory) is installed in the storage unit 33 or when the still image capture/display program 41 is downloaded from a server or the like to the storage unit 33 through a communication medium such as the Internet, a phone line, etc.

The still image data storage portion 51 in FIG. 2 acquires frame image data from the LCD controller 35 and stores the frame image data in the storage unit 33. The still image data storage portion 51 stores the acquired frame image data as the first or second still image data 42 or 43 in the storage unit 33.

Incidentally, the first still image data 42 are frame image data generated by the image capture controller 12 in a first exposure time period which will be described later. The second still image data 43 are frame image data generated by the image capture controller 12 in a second exposure time period which is different from the first exposure time period and which will be described later.

The hand-shaking detection portion 52 judges whether hand-shaking occurs in an exposure time period or not. When hand-shaking not narrower than a predetermined allowable quantity (e.g. a width of 5 pixels) occurs in the exposure time period, the hand-shaking detection portion 52 concludes that hand-shaking occurs. When hand-shaking narrower than the predetermined allowable quantity occurs in the exposure time period, the hand-shaking detection portion 52 concludes that hand-shaking does not occur.

The gyro log data storage portion 53 stores data inputted to the input/output port 34 in the storage unit 33. Accordingly, the gyro log data 45 are stored in the storage unit 33.

In FIG. 4, each line is equivalent to one record. Each record includes a sample number 71, Y-axis gyro data 72, Z-axis gyro data 73, VSYNC mark data 74, and hand-shaking mark data 75. When new gyro data are input to the input/output port 34, the gyro log data storage portion 53 stores one-record's data in the storage unit 33.

Each sample number 71 is a unique number given to a corresponding record. In FIG. 4, the sample numbers 71 are provided as numbers incremented one by one in descending order. The gyro log data storage portion 53 adds a generated record to the tail of the gyro log data 45 (i.e. the bottom of the table shown in FIG. 4). In this manner, records are arranged from the upper side of FIG. 4 to the lower side of FIG. 4 in order of acquisition by the gyro log data storage portion 53.

The Y-axis gyro data 72 is gyro data inputted from one A/D converter 15 to the input/output port 34. The Z-axis gyro data 73 is gyro data inputted from the other A/D converter 16 to the input/output port 34.

The VSYNC mark data 74 is data having a value in accordance with presence/absence of a VSYNC signal. For example, the VSYNC mark data 74 indicates "1" in the case where there is a VSYNE signal when the gyro log data storage portion 53 acquires gyro data. The VSYNC mark data 74 indicates "0" in the case where there is no VSYNC signal when the gyro log data storage portion 53 acquires gyro data.

The hand-shaking mark data 75 is data having a value in accordance with a result of the judgment made by the hand-shaking detection portion 52. For example, in the case where the hand-shaking detection portion 52 judges that there is no hand-shaking and outputs a result of the judgment when the gyro log data storage portion 53 acquires gyro data, the hand-shaking mark data 75 indicates "OK". In the case where the hand-shaking detection portion 52 judges that hand-shaking occurs and outputs a result of the judgment when the gyro log data storage portion 53 acquires gyro data, the hand-shaking mark data 75 indicates "NG".

Returning to FIG. 2, description will be described. The corrected still image data generating portion 54 generates new frame image data by a predetermined arithmetic process based on the first still image data 42 and the second still image data 43 which are stored in the storage unit 33. The corrected still image data generating portion 54 stores the generated frame image data as corrected still image data 44 in the storage unit 33.

The still image capture sequence control portion 55 manages operation of the image capturing device in the image capture mode. For example, the still image capture sequence control portion 55 manages operations of the image capture controller 12, the hand-shaking detection portion 52, the gyro log data storage portion 53, the still image data storage portion 51, and the correction still image data generating portion 54 in the image capture mode.

The display processing portion 61 in FIG. 3 reads the corrected still image data 44 stored in the storage unit 33 in the playback mode. The display processing portion 61 supplies the read corrected still image data 44 as frame image data to the LCD controller 35.

Next, operation of the image capturing device having the aforementioned configuration will be described. The following description will be first made on the image capture mode and then on the playback mode.

When the image capturing device is started, the VSYNC signal generator 17 of the image capture controller 12 outputs a VSYNC signal with pulses at intervals of a predetermined time period. The image capture controller 12 controls the image capture unit 11 to captures a still image in synchronism with the VSYNC signal to thereby generate frame image data for forming one frame image. The image capture controller 12 supplies the generated frame image data to the LCD controller 35 through the input/output port 34.

When the frame image data is supplied to the LCD controller 35, the LCD controller 35 stores the frame image data in the VRAM 38. The LCD controller 35 reads the frame image data from the VRAM 38 at intervals of a predetermined time period, so that an image based on the read data is displayed on the LCD 37. Accordingly, the image captured by the image capture unit 11 is displayed on the LCD 37. The image displayed on the LCD 37 is updated in synchronism with the time period of the VSYNC signal.

When the image capturing device is started, the CPU 31 reads the still image capture/display program 41 from the storage unit 33 to the RAM 32 and executes the still image capture/display program 41. Thus, the still image data storage portion 51, the hand-shaking detection portion 52, the gyro log data storage portion 53, the corrected still image data generating portion 54 and the still image capture sequence control portion 55 which are shown in FIG. 2 are implemented by the image capturing device. The display processing portion 61 shown in FIG. 3 is further implemented by the image capturing device.

When the user operates the image capture button 21, the operation portion 2 supplies input data to the still image capture sequence control portion 55 to give an instruction to the still image capture sequence control portion 55 to start the image capture mode as shown in FIG. 2.

Figure 5:
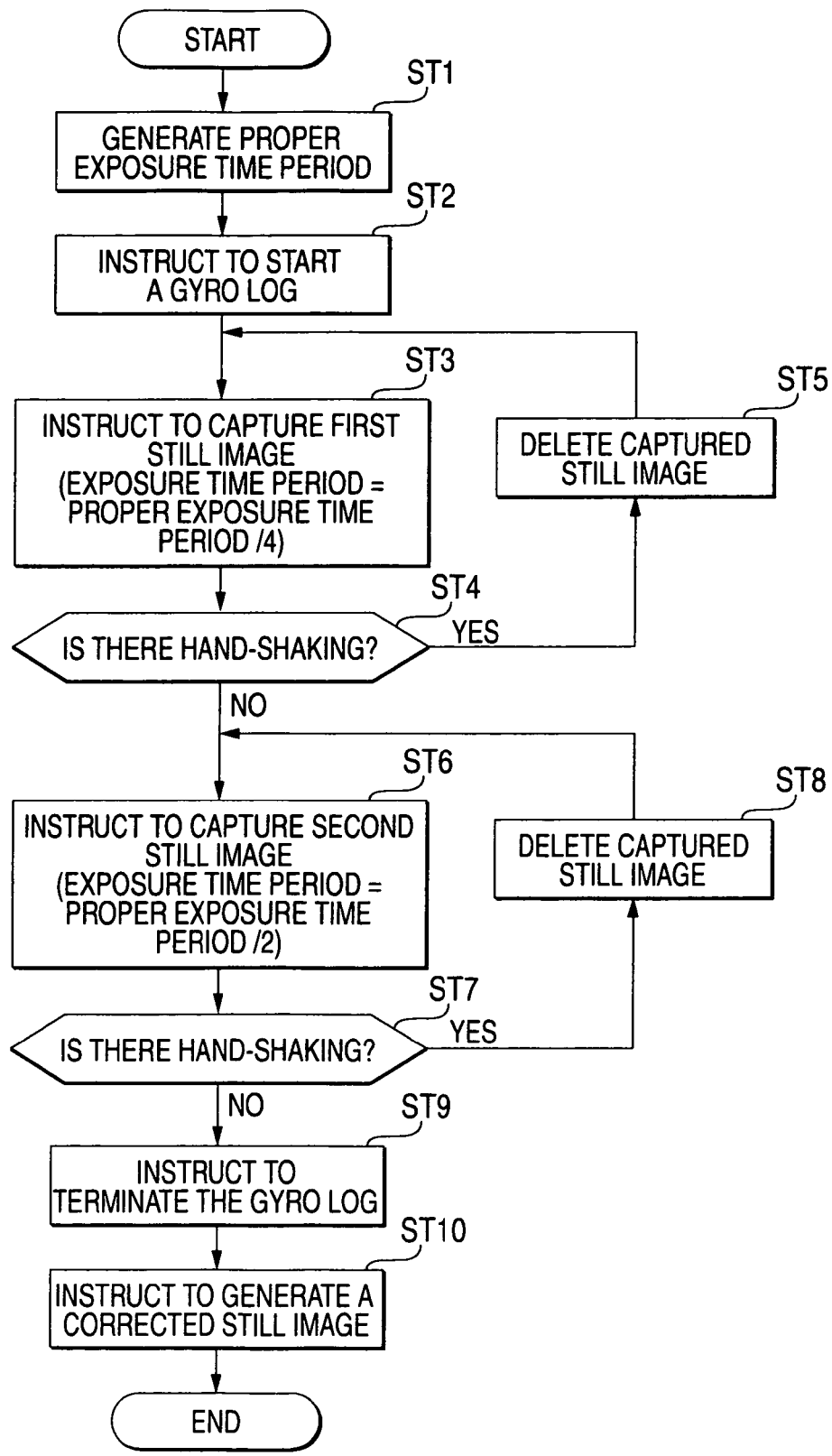
FIG. 5 is a flow chart showing a still image capture sequence.

FIG. 5 is a flow chart showing a still image capture sequence executed by the still image capture sequence control portion 55 in FIG. 2.

First, the still image capture sequence control portion 55 determines a proper exposure time period for capturing a still image (step ST1). Specifically, for example, the still image capture sequence control portion 55 requests the LCD controller 35 to read frame image data. The LCD controller 35 reads the frame image data from the VRAM 38 and supplies the frame image data to the still image capture sequence control portion 55. The still image capture sequence control portion 55 analyzes brightness of an image based on the supplied frame image data and determines a proper exposure time period in accordance with the brightness of the image. The proper exposure time period tends to become shorter as the image based on the frame image data becomes brighter. Incidentally, the still image capture sequence control portion 55 may determine the proper exposure time period based on the brightness measured by a not-shown photo acceptance element such as an illuminometer or a CdS cell.

After generation of the proper exposure time period, the still image capture sequence control portion 55 instructs the gyro log data storage portion 53 to start storage of gyro data (step ST2). The gyro log data storage portion 53 starts the storage process as follows. That is, when two new gyro data are input from the two A/D converters 15 and 16 to the input/output port 34, the gyro log data storage portion 53 acquires the output of the VSYNC signal generator 17 and the output of the hand-shaking detection portion 52 from the input/output port 34. The gyro log data storage portion 53 generates a record containing these acquired data and a new generated sample number 71, and stores the record in the storage unit 33 additionally.

Accordingly, the two gyro data input to the input/output port 34 are accumulated, together with VSYNC mark data 74 indicating presence/absence of a VSYNC signal and hand-shaking mark data 75 indicating presence/absence of hand-shaking, in the storage unit 33. The gyro log data 45 are stored in the storage unit 33.

After the instruction to start storage of the gyro data, the still image capture sequence control portion 55 instructs the image capture controller 12 and the hand-shaking detection portion 52 to capture a first still image. The still image capture sequence control portion 55 designates one fourth of the proper exposure time period as an exposure time period and gives an instruction to capture the first still image. Hereinafter, the exposure time period for the first still image is referred to as "first exposure time period". The still image capture sequence control portion 55 also instructs the still image data storage portion 51 to store the captured first still image (step ST3).

Upon reception of the instruction to capture the first still image, the image capture controller 12 captures the still image in the designated first exposure time period. When the designated first exposure time period has lapsed since the image capture controller 12 outputted a reset signal to each group of photo acceptance elements, the image capture controller 12 reads level signals of the photo acceptance elements belonging to the group. The image capture controller 12 generates frame image data based on all the read level signals of the photo acceptance elements and supplies the frame image data to the LCD controller 35 through the input/output port 34. The LCD controller 35 stores the supplied frame image data in the VRAM 38.

Upon reception of the instruction to store the first still image, the still image data storage portion 51 requests the LCD controller 35 for the frame image data. The LCD controller 35 reads the frame image data stored in the VRAM 38 and supplies the frame image data to the still image data storage portion 51. The still image data storage portion 51 stores the supplied frame image data as first still image data 42 in the storage unit 33.

Upon reception of the instruction to capture the first still image in cooperation with the image capture controller 12, the hand-shaking detection portion 52 detects whether hand-shaking not narrower than a predetermined allowable quantity occurs in the first exposure time period or not. Specifically, the hand-shaking detection portion 52 monitors the outputs of the two A/D converters 15 and 16 during a time period equivalent to the first exposure time period on the basis of the input of the VSYNC signal after instructed to capture the first still image. When, for example, hand-shaking not narrower than a width of five pixels as the predetermined allowable quantity occurs in the monitoring time period, the hand-shaking detection portion 52 concludes that hand-shaking occurs. When, for example, hand-shaking not narrower than the predetermined allowable quantity does not occur during the monitoring time period, the hand-shaking detection portion 52 concludes that hand-shaking does not occur.

The hand-shaking detection portion 52 supplies a result of the conclusion concerned with hand-shaking to the still image capture sequence control portion 55 and the gyro log data storage portion 53. The gyro log data storage portion 53 stores the result of detection by the hand-shaking detection portion 52 as gyro log data 45 together with the gyro data. As shown in FIG. 2, one hand-shaking mark data 75 indicating "OK" or "NG" is always put between a record in a still image capture time period and a record in a next still image capture time period.

When the first exposure time period has lapsed since the image capture controller 12, the hand-shaking detection portion 52 and the still image data storage portion 51 were instructed, the still image capture sequence control portion 55 judges whether hand-shaking occurs in the first still image or not (step ST4). The judgment made by the still image capture sequence control portion 55 as to whether hand-shaking occurs or not, is based on the result of detection by the hand-shaking detection portion 52.

When the hand-shaking detection portion 52 detects hand-shaking, the still image capture sequence control portion 55 deletes the first still image data 42 stored in the storage unit 33 (step ST5). Then, the still image capture sequence control portion 55 instructs the image capture controller 12, the hand-shaking detection portion 52 and the still image data storage portion 51 to capture and store a first still image in a first exposure time period again (step ST3).

As a result, the image capture controller 12 captures a still image in the first exposure time period. The still image data storage portion 51 stores frame image data of the still image as first still image data 42 in the storage unit 33. The hand-shaking detection portion 52 detects whether hand-shaking occurs in the first exposure time period or not. The gyro log data storage portion 53 stores a record including the result, of detection by the hand-shaking detection portion 52, as gyro log data 45 in the storage unit 33. As a result, the first still image data 42 newly captured and the gyro log data 45 up to the image capture time period are stored in the storage unit 33.

When the first exposure time period has lapsed, the still image capture sequence control portion 55 makes a judgment again, on the basis of the result of detection by the hand-shaking detection portion 52, as to whether hand-shaking occurs or not (step ST4).

When hand-shaking is not detected by the hand-shaking detection portion 52, the still image capture sequence control portion 55 starts a process for capturing a second still image. Specifically, the still image capture sequence control portion 55 designates a half of the proper exposure time period as a second exposure time period and instructs the image capture controller 12, the hand-shaking detection portion 52 and the still image data storage portion 51 to capture and store the second still image (step ST6).

Upon reception of the instruction to capture the second still image, the image capture controller 12 captures a still image in the designated second exposure time period. The still image data storage portion 51 stores frame image data of the still image as second still image data 43 in the storage unit 33. The hand-shaking detection portion 52 detects whether hand-shaking occurs in the second exposure time period or not. The gyro log data storage portion 53 stores a record including a result of detection by the hand-shaking detection portion 52, as gyro log data 45 in the storage unit 33.

When the second exposure time period has lapsed since the image capture controller 12, the hand-shaking detection portion 52 and the still image data storage portion 51 were instructed, the still image capture sequence control portion 55 judges whether hand-shaking occurs in the second still image or not (step ST7). The judgment made by the still image capture sequence control portion 55 as to whether hand-shaking occurs or not, is based on the result of detection in the second exposure time period by the hand-shaking detection portion 52.

When hand-shaking is detected by the hand-shaking detection portion 52, the still image capture sequence control portion 55 deletes the second still image data 43 stored in the storage unit 33 (step ST8), and instructs the image capture controller 12, the hand-shaking detection portion 52 and the still image data storage portion 51 to capture and store a second still image in a second exposure time period again (step ST6).

The image capture controller 12 captures a still image in the second exposure time period. The still image data storage portion 51 stores frame image data of the still image as second still image data 43 in the storage unit 33. The hand-shaking detection portion 52 detects whether hand-shaking occurs in the second exposure time period or not. The gyro log data storage portion 53 stores a record including a result of the detection by the hand-shaking detection portion 52, as gyro log data 45 in the storage unit 33. Accordingly, the second still image data 43 newly captured and the gyro log data 45 in the capture time period are stored in the storage unit 33.

After the lapse of the second exposure time period, the still image capture sequence control portion 55 makes a judgment again on the basis of the result of detection by the hand-shaking detection portion 52 as to whether hand-shaking occurs or not (step ST7).

When hand-shaking is not detected by the hand-shaking detection portion 52, the still image capture sequence control portion 55 instructs the gyro log data storage portion 53 to terminate storage of the gyro log data (step ST9). The gyro log data storage portion 53 terminates the storage process. Thus, the gyro log data 45 in the time period from the time point when the still image capture sequence control portion 55 instructs the gyro log data storage portion 53 to start storage of gyro log data to the time point when the still image capture sequence control portion 55 instructs the gyro log data storage portion 53 to terminate storage of the gyro log data are stored in the storage unit 33.

When the still image capture sequence control portion 55 instructs the gyro log data storage portion 53 to terminate storage of the gyro log data, the process using the image capture unit 11 for capturing the still image is terminated. The still image capture sequence control portion 55 instructs the corrected still image data generating portion 54 to generate a corrected still image (step ST10).

When the corrected still image data generating portion 54 starts generation of the corrected still image, the corrected still image data generating portion 54 first calculates the quantity of displacement between the still image in the first still image data 42 and the still image in the second still image data 43.

Figure 6:
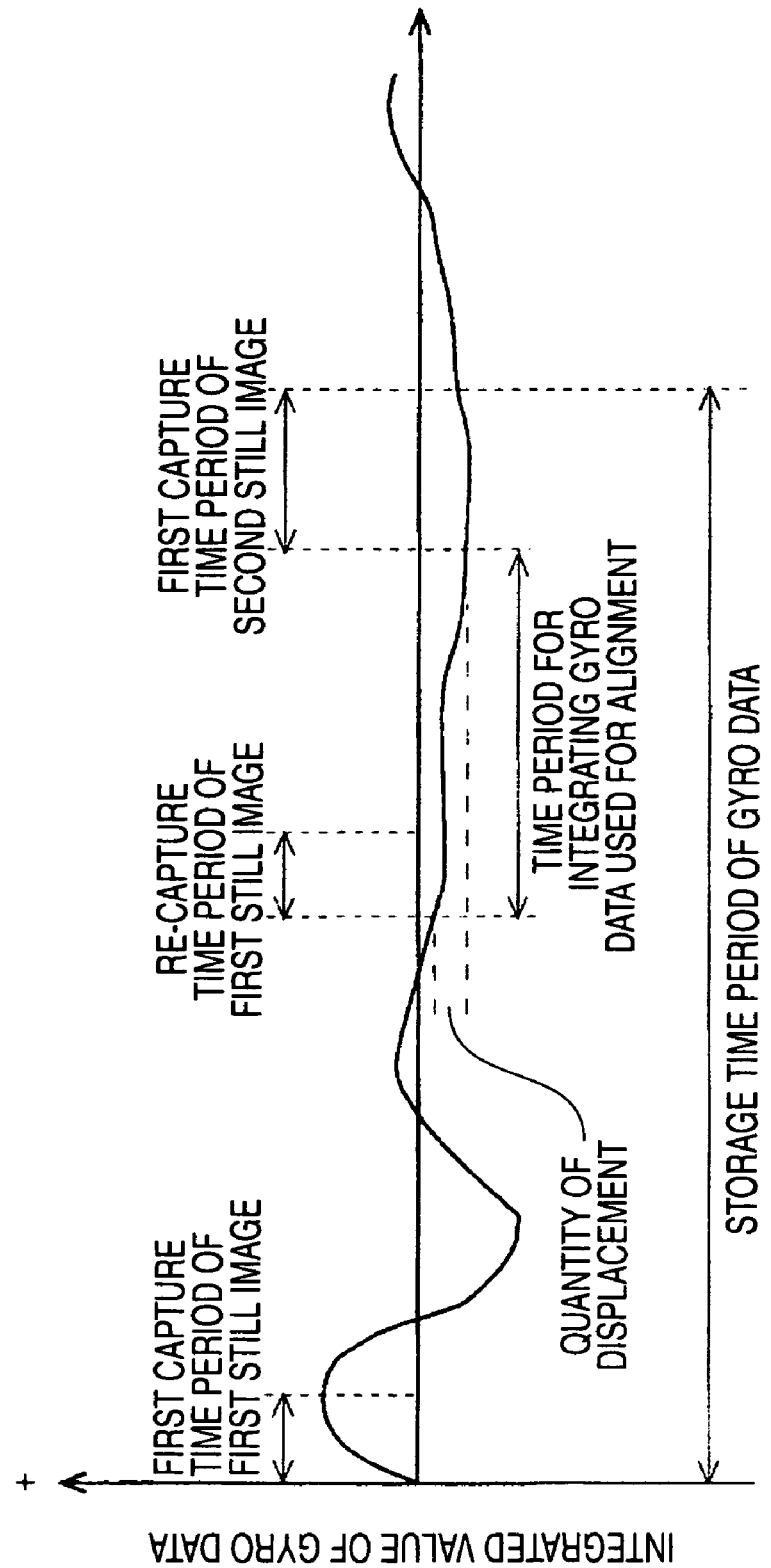
FIG. 6 is a graph showing an example of time change in the integrated value in gyro log data with lapse of time.

FIG. 6 is a view showing an example of time change in the integrated value in the gyro log data 45 stored in the storage unit 33 in FIG. 2. A plurality of records in the gyro log data 45 are arranged in a time sequence as shown in FIG. 4. Each record contains Y-axis gyro data 72, and Z-axis gyro data 73. For example, the vertical axis in FIG. 6 shows a value obtained by integrating the Z-axis gyro data 73 in the time sequence. The horizontal axis in FIG. 6 shows a lapse time since the start of storage of the gyro data. As shown in FIG. 6, the integrated value of the gyro data fluctuates in the storage time period of the gyro data.

The corrected still image data generating portion 54 specifies two records containing hand-shaking mark data 75 of "OK (no hand-shaking)" from the plurality of records in the gyro log data 45. For example, as shown in FIG. 4, a record of Sample No. "386" and a record of Sample No. "426" are specified.

Then, the corrected still image data generating portion 54 further specifies records which contain VSYNC mark data 74 of "1 (presence of VSYNC signal)" and which are earlier than the specified records containing hand-shaking mark data 75 of "OK (no hand-shaking)", respectively. For example, as shown in FIG. 4, a record of Sample No. "371" and a record of Sample No. "411" are specified. These records are records each of which indicates the timing of the start of the capturing of the still image judged to be a still image without hand-shaking. Hereinafter, earlier one (record of Sample No. "371" in FIG. 4) of the two specified records marked with presence of the VSYNC signal is referred to as "first record" and latter one (record of Sample No. "411" in FIG. 4) is referred to as "second record" in terms of time sequence.

Then, the corrected still image data generating portion 54 integrates gyro data in a section of from the first record to a record just before the second record to thereby calculate the quantity of displacement in this section. In FIG. 4, gyro data in the section of from the record of Sample No. "371" to the record of Sample No. "410" are integrated. The quantity of displacement indicates displacement in a time period of from the start of the capturing of the first still image to the start of the capturing of the second still image. That is, the quantity of displacement indicates displacement between the still image in the first still image data 42 and the still image in the second still image data 43.

Alternatively, the corrected still image data generating portion 54 may integrate gyro data in a section of from a record (of Sample No. "372" in FIG. 4) following the first record to the second record (of Sample No. "411" in FIG. 4) to thereby calculate the quantity of displacement between the still image in the first still image data 42 and the still image in the second still image data 43.

After calculation of the quantity of displacement between the still image in the first still image data 42 and the still image in the second still image data 43, the corrected still image data generating portion 54 superposes the still image in the first still image data 42 and the still image in the second still image data 43 on each other with a correction value for canceling the quantity of displacement to thereby specify an overlap range of the still images.

Figure 7:
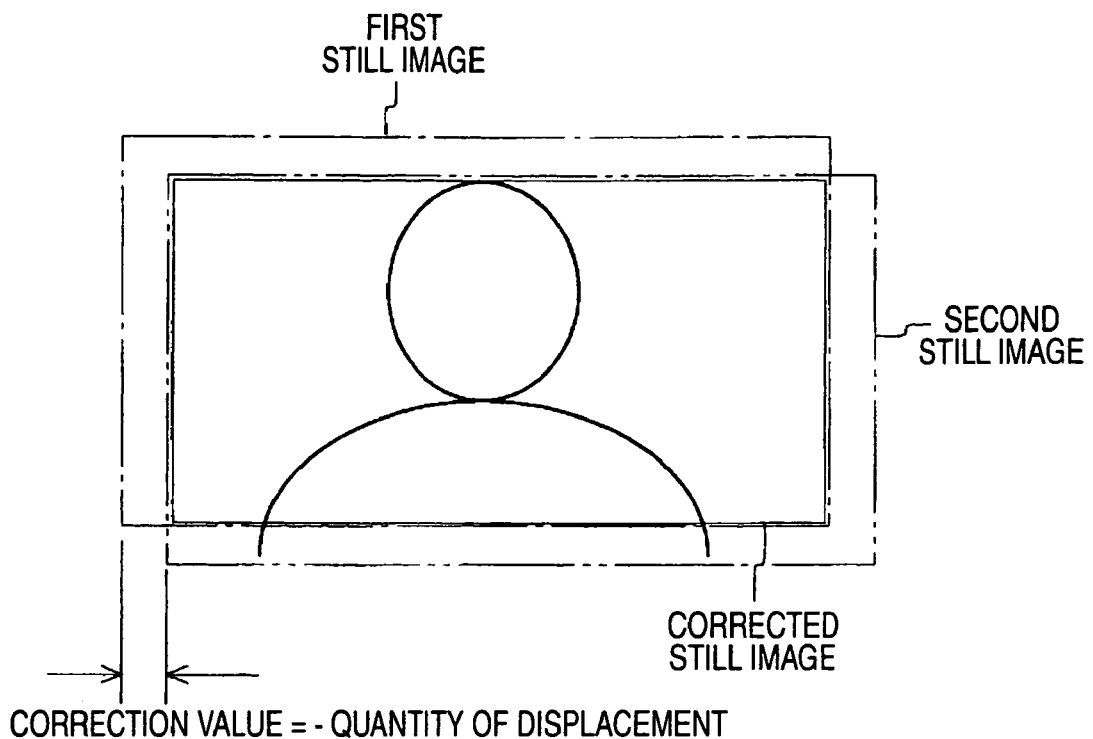
FIG. 7 is a view showing correspondence when still images are superposed on each other so that the quantity of displacement cancels out.

FIG. 7 is a view showing correspondence in superposition of the still images when the still image in the first still image data 42 and the still image in the second still image data 43 in FIG. 2 are superposed on each other with a correction value for canceling the quantity of displacement. In FIG. 7, the chain line frame shows the contour of the still image in the first still image data 42. The chain double-dashed dashes line frame shows the contour of the still image in the second still image data 43. The solid line frame shows the contour of the overlap image range when the still image in the first still image data 42 and the still image in the second still image data 43 are superposed on each other. Incidentally, the solid line frame forms the contour of the still image in the corrected still image data 44.

The still image in the second still image data 43 is superposed on the still image in the first still image data 42 in the condition that the contour of the still image in the second still image data 43 is displaced by the correction value from the contour of the still image in the first still image data 42. In FIG. 7, the upper left side of the still image in the second still image data 43 is fitted to the lower right side of the still image in the first still image data 42.

After specifying the overlap image range when the still image in the first still image data 42 and the still image in the second still image data 43 are superposed on each other with the correction value, the corrected still image data generating portion 54 calculates color data in the proper exposure time period with respect to each pixel in the overlap image range.

Figure 8:
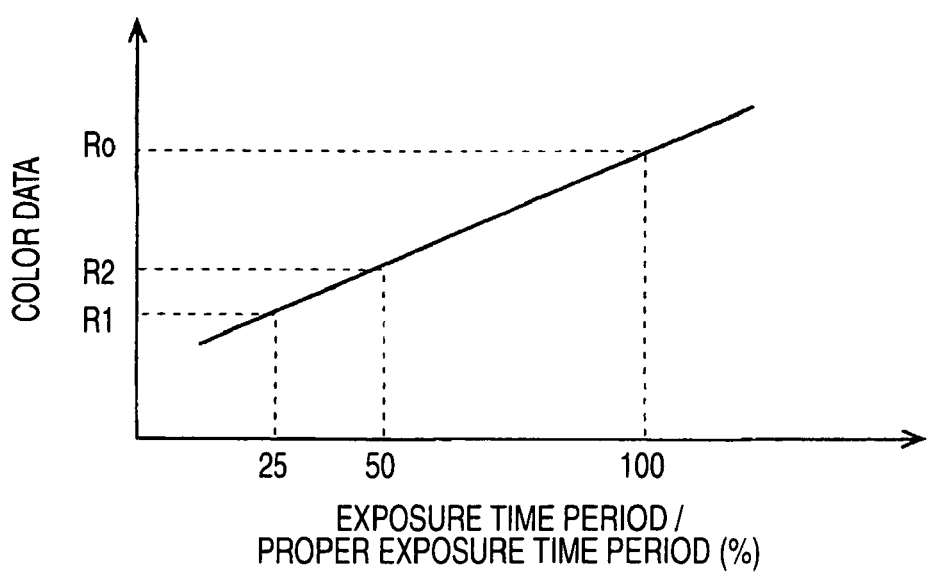
FIG. 8 is a graph for explaining a method of calculating color data of each pixel in a proper exposure time period.

FIG. 8 is a graph for explaining a method using the corrected still image data generating portion 54 for calculating color data in the proper exposure time period in accordance with each pixel. In FIG. 8, the horizontal axis represents an exposure time period ratio when the proper exposure time period is regarded as 100%. The vertical axis represents color data of each pixel.

The still image in the first still image data 42 is captured in the first exposure time period which is a quarter of the proper exposure time period. The exposure time period ratio of the first exposure time period is 25% when the proper exposure time period is regarded as 100%. The still image in the second still image data 43 is captured in the second exposure time period which is a half of the proper exposure time period. The exposure time period ratio of the second exposure time period is 50% when the proper exposure time period is regarded as 100%.

As shown in FIG. 8, on the assumption that R1 is color data of a pixel in the still image in the first still image data 42 and R2 is color data of a pixel in the still image in the second still image data 43, the corrected still image data generating portion 54 specifies a line segment connecting these color data on a straight line and calculates color data to obtain the exposure time period of 100% on the line segment, as color data R0 in the proper exposure time period in accordance with the following expression 1.

$$R0 = 3 \times R2 - 2 \times R1 \qquad \text{Expression 1}$$
$$= (R2 - R1) \times (1 - 0.25)/(0.5 - 0.25) + R1$$

The corrected still image data generating portion 54 calculates color data for each of all pixels in the overlap image range in accordance with Expression 1.

After calculation of color data for all pixels in the proper exposure time period, the corrected still image data generating portion 54 generates corrected still image data 44. The still image in the corrected still image data 44 is put in the overlap image range in which the still image in the first still image data 42 and the still image in the second still image data 43 are superposed on each other. Color data in the proper exposure time period are provided as color data for respective pixels in the still image in the corrected still image data 44. The corrected still image data generating portion 54 stores the generated corrected still image data 44 in the storage unit 33.

Next, the playback mode will be described. When the user operates the playback button 22, the operation portion 2 supplies input data to the display processing portion 61 to instruct the display processing portion 61 to start the playback mode, as shown in FIG. 3.

Upon reception of the instruction to start the playback mode, the display processing portion 61 reads the corrected still image data 44 from the storage unit 33 and supplies the corrected still image data 44 to the LCD controller 35. The LCD controller 35 writes the supplied corrected still image data 44 in the VRAM 38. The LCD controller 35 also reads frame image data stored in the VRAM 38 at intervals of a predetermined time period and displays an image based on the read data on the LCD 37. In this manner, the still image based on the corrected still image data 44 is displayed on the LCD 37. In FIG. 7, the image in the solid line frame is displayed.

As described above, in this embodiment, the image capture controller 12 outputs the first still image data 42 captured in the first exposure time period shorter than the proper exposure time period and the second still image data 43 captured in the second exposure time period shorter than the proper exposure time period. The corrected still image data 44 is generated on the basis of these still image data stored in the storage unit 33 so that the still image which would be captured in the proper exposure time period can be formed from the corrected still image data 44.

Accordingly, each two or more still image can be captured in an exposure time period shorter than the proper exposure time period so that the still image which would be picked up in the proper exposure time period can be obtained on the basis of the two or more still images. The influence of hand-shaking on the image capture controller 12 is suppressed compared with the case where a still image is captured in the proper exposure time period.

In this embodiment, the first exposure time period is set to be equal to a quarter of the proper exposure time period, and the second exposure time period is set to be equal to a half of the proper exposure time period. The total exposure time period as the sum of the first exposure time period and the second exposure time period is equal to three fourth of the proper exposure time period. Accordingly, the influence of hand-shaking can be suppressed more extremely. For example, in comparison with the case where the proper exposure time period is divided into a plurality of exposure time period parts so that a plurality of still images captured in the divided exposure time period parts respectively are superposed on one another to obtain a final still image, the influence of hand-shaking can be suppressed. Moreover, when the first exposure time period just after the operation of the image capture button 21 is set to be equal to a quarter of the proper exposure time period and the second exposure time period is set to be equal to a half of the proper exposure time period, the influence of hand-shaking can be suppressed because hand-shaking occurs easily just after the operation of the image capture button 21.

In this embodiment, the corrected still image data generating portion 54 generates a still image based on the corrected still image data 44 in accordance with still image correspondence in superposition of the still images by using gyro data obtained in respective time periods for capturing the first and second still image data 42 and 43 so that quantities of displacement generated in these image capture time periods cancel out. That is, the still images based on the two still image data are related to each other so that the quantity of displacement in the image capture controller 12 cancels out.

Accordingly, even if the image capture ranges of the two still images are displaced from each other because of hand-shaking in the time periods for capturing the two still images, the two still images can be related to each other with respect to a standstill object in the two still images so that the two still images are superposed on each other. With respect to a moving object in the two still images, the two still images can be related to each other inclusively of blurring due to the movement of the object. In this manner, the two still images can be related to each other appropriately in accordance with the movement of the object.

Incidentally, when feature points in respective still images are extracted by image processing so that the still images are related to one another on the basis of correspondence between the feature points, there is a possibility that the still images cannot be related to one another well if the feature points are based on a moving object.

In this embodiment, color data of each pixel in the still image based on the corrected still image data 44 is generated from color data of pixels overlapping each other in the aforementioned still image correspondence. Accordingly, information of each pixel in the still image based on the correct5ed still image data 44 is generated from information of pixels overlapping each other correspondingly, so that the influence of information of ambient pixels is suppressed. As a result, for example, a standstill object can be incorporated in the corrected still image on the basis of the contour of the object at a standstill state. A moving object can be incorporated in the corrected still image on the basis of the contour of the object inclusive of blurring due to the movement of the object. In this manner, a still image with quality equal to the quality of a still image captured in the proper exposure time period can be obtained as the still image based on the corrected still image data.

In this embodiment, information in accordance with each pixel is generated on the assumption that color data of each pixel in the first still image data 42, color data of each pixel in the second still image data 43 and color data of each pixel in the corrected still image data have linear relations to one another. Accordingly, the corrected still image data generating portion 54 can generate information in accordance with each pixel by a simple linear arithmetic operation.

In this embodiment, the image capture controller 12 repeats capturing still images when hand-shaking is detected by the hand-shaking detection portion 52 at the time of capturing still images. Accordingly, the image capture controller 12 can capture good-quantity still images without hand-shaking detected.

In this embodiment, the corrected still image data generating portion 54 calculates quantities of displacement of still images based on two still image data outputted from the image capture controller 12 by using gyro data accumulated in the storage unit 33 and generates corrected still image data 44, as a still image which would be captured in the proper exposure time period, on the basis of correspondence between the still images superposed on each other so that the quantities of displacement cancel out. Accordingly, even if the image capture controller 12 repeats capturing still images, the corrected still image data generating portion 54 relates the still images based on the two still image data stored in the storage unit 33 to each other so that the quantities of displacement of the still images cancel out after all the still images are captured.

In this embodiment, the corrected still image data generating portion 54 relates still images to each other on the assumption that each still image data is captured at timing in the case where the VSYNC mark data 74 is "1" when the hand-shaking mark data 75 in the gyro log data 45 is "OK". Accordingly, even if a larger number of VSYNC mark data 74 with the value "1" than the number of still image data (two in this example) used for generating the corrected still image are contained in the gyro log data 45 as a result of capturing of still images under the control of the image capture controller 12, the corrected still image data generating portion 54 can appropriately relate still images based on the still image data 42 and 43 used for generating the corrected still image.

In this embodiment, the still image capture sequence control portion 55 generates a proper exposure time period in accordance with the operation of the image capture button 21, controls the image capture controller 12 to capture two still image data and controls the corrected still image data generating portion 54 to generate corrected still image data 44. Accordingly, when the image capture button 21 is once operated by the user, the still image capture sequence control portion 55 can control the image capture controller 12 to capture two still image data to thereby generate corrected still image data 44 on the basis of the two still image data. In view from the user side, when the user once operates the image capture button 21, the user can capture a still image in the same manner as in the case where a still image is captured by a general camera.

Although the embodiment has been described as a preferred embodiment of the invention, the invention is not limited thereto and various changes or modifications may be made without departing from the gist of the invention.

In the embodiment, the still image capture sequence control portion 55 starts accumulation of gyro log data 45 and capturing of still images after judgment with respect to a proper exposure time period. Alternatively, the still image capture sequence control portion 55 may generate a proper exposure time period after start of accumulation of gyro log data 45 and capturing of still images. For example, after a first still image is captured in a fixed exposure time period so that a proper exposure time period is generated on the basis of the first still image, a still image which will be used for generating a corrected still image may be captured. Further alternatively, after accumulation of gyro log data 45 and capturing of still images are started, a proper exposure time period may be generated on the basis of the first still image so that a second still image and still images after the second still image can be captured in an exposure time period based on the proper exposure time period.

In the embodiment, the first exposure time period is equal to a quarter of the proper exposure time period and the second exposure time period is equal to a half of the proper exposure time period. Alternatively, the first exposure time period may be set to be equal to one third of the proper exposure time period and the second exposure time period may be set to be equal to two thirds of the proper exposure time period. Further alternatively, the first exposure time period may be set to be equal to one fifth of the proper exposure time period and the second exposure time period may be set to be equal to four fifths of the proper exposure time period. The total of the first exposure time period and the second exposure time period may be 1 or may be smaller than 1. Incidentally, when the total exposure time period is smaller than 1, the influence of hand-shaking is suppressed more surely compared with the case where an image is captured in the proper exposure time period.

In the embodiment, the image capture controller 12 captures still images in the first exposure time period and the second exposure time period designated by the still image capture sequence control portion 55. Alternatively, the image capture controller 12 may capture still images in a first exposure time period and a second exposure time period which are set as predetermined fixed values respectively in advance.

In the embodiment, two still images for first and second still image data 42 and 43 are captured so that a still image for corrected still image data 44 is generated on the basis of the two still images. Alternatively, three or more still images may be captured so that a corrected still image is generated on the basis of the three or more still images.

In the embodiment, the corrected still image data generating portion 54 generates a corrected still image in an image overlap range obtained when the still image based on the first still image data 42 and the still image based on the second still image data 43 are superposed on each other. Alternatively, the corrected still image data generating portion 54 may generate a corrected still image in the same range as the range of the first still image data 42 or may generate a corrected still image in the same range as the range of the second still image data 43. In this case, color data of pixels in a range in which the still images of the first and second still image data do not overlap each other may be changed on the basis of a color data ratio which is obtained in such a manner that the ratio of color data of pixels in the image overlap range in the proper exposure time period to color data of the pixels in an image as a base of correction is calculated.

In the embodiment, the corrected still image data generating portion 54 calculates color data of pixels in the corrected still image on the assumption that color data of the pixels in the first still image data 42, color data of the pixels in the second still image data 43 and color data of the pixels in the proper exposure time period have linear relations to one another. Alternatively, the corrected still image data generating portion 54 may obtain color data of pixels in the corrected still image, for example, by using a color data correspondence table or the like indicating correspondence among color data of the pixels in the first still image data 42, color data of the pixels in the second still image data 43 and values of the pixels in the proper exposure time period. When such a color data correspondence table is used, color data of pixels in the corrected still image can be obtained, for example, on the assumption that the three color data have non-linear relations to one another.

In the embodiment, the still image data storage portion 51 obtains frame image data captured by the image capture unit 11, through the LCD controller 35. Alternatively, the still image data storage portion 51 may obtain frame image data directly from the image capture controller 12 or the image capture unit 11.

In the embodiment, the gyro log data storage portion 53 accumulates gyro data in a time period of from the instruction to start storage to the instruction to terminate storage, in the storage unit 33. Alternatively, the gyro log data storage portion 53 may accumulate gyro data in a time period of from the timing of starting capturing of the first still image data judged "OK" by the hand-shaking detection portion 52 to the timing of terminating capturing of the second still image judged "OK" by the hand-shaking detection portion 52, in the storage unit 33.

In the embodiment, the still image capture sequence control portion 55 deletes captured still image data from the storage unit 33 and performs control to re-capture still images in the same exposure time period when hand-shaking is detected. Alternatively, the still image capture sequence control portion 55 may change the exposure time period stepwise when a still image is re-captured.

Further alternatively, the still image capture sequence control portion 55 may advance the sequence under the presence of hand-shaking even if hand-shaking occurs. In this case, after capturing of still images by the image capture unit 11 is completed, a process of correcting hand-shaking in the image with hand-shaking may be executed and then an instruction may be given to generate a corrected still image.

Incidentally, such a still image with hand-shaking can be corrected when the still image capture sequence control portion 55 instructs a hand-shaking correction processing portion to execute the hand-shaking correction process. For example, the hand-shaking correction processing portion may execute a process of dividing the still image with hand-shaking into image parts by the number of gyro data in the still image capture time period and emphasizing the edge of the image with a strength corresponding to the quantity of displacement in accordance with each of the divided image parts.

In the embodiment, the image capture unit 11 has a plurality of photo acceptance elements classified into groups by the image capture controller 12, so that level signals of the photo acceptance elements are read successively in accordance with each group. Alternatively, the image capture unit 11 may have a shutter mechanism which is opened and shut mechanically. In this case, the image capture controller 12 may perform control so that the photo acceptance elements are reset collectively in the shut state of the shutter to thereby open the shutter for a predetermined exposure time period and then level signals of the photo acceptance elements are read collectively.

The invention can be applied to an image capturing device such as a camera-containing portable phone terminal.

What is claimed is:

1. An image capturing device comprising:
an image capturer,
   operable to perform a first image capturing of an object image so as to generate first image data corresponding to a first time period shorter than a predetermined time period, and
   operable to perform a second image capturing of the object image so as to generate second image data corresponding to a second time period shorter than the predetermined time period;
a storage, adapted to store the first image data and the second image data;
an image generator, operable to generate image data corresponding to the predetermined time period based on the first image data and the second image data; and
a detector, operable to detect movement of the image capturer and to generate movement data based on the detected movement,
wherein the first time period is defined from a first time point to a second time point,
wherein the second time period is defined from a third time point to a fourth time point, and
wherein the image generator generates third image data by superposing the first image data and the second image data based on the movement data corresponding to a third time period defined between the first time point and the third time point, and the image data is generated based on the third image data.

2. The image capturing device according to claim 1, wherein
a sum of the first time period and the second time period is shorter than the predetermined time period.

3. The image capturing device according to claim 1, wherein
the first image data includes first pixel information,
the second image data includes second pixel information, and
the image generator generates pixel information of the image data based on the first pixel information and the second pixel information.

4. The image capturing device according to claim 3, wherein
the first time period is different from the second time period,
the first pixel information is associated with the second pixel information via a predetermined correlation, and
the pixel information of the image data is determined based on the predetermined correlation.

5. The image capturing device according to claim 1, further comprising a controller, operable to:
detect movement of the image capturer and to generate movement data based on the detected movement;
detect shaking of the image capture in a case where the movement data indicates that the movement is no less than a predetermined value; and
cause the image capturer to perform a third image capturing of the object image so as to generate third image data corresponding to a third time period, length of which is identical with that of the first time period, in a case where the shaking of the image capturer is detected.

6. The image capturing device according to claim 5, wherein
the storage is adapted to store the movement data,
the third time period is defined from a first time point to a second time point,
the second time period is defined from a third time point to a fourth time point, and
the image generator generates fourth image data by superposing the third image data and the second image data based on the stored movement data corresponding to a fourth time period defined between the first time point and the third time point, and the image data is generated based on the fourth image data.

7. The image capturing device according to claim 6, wherein
the storage is adapted to store the movement data in association with timing data based on the first time point and the third time point and shaking data based on the shaking of the image capturer.

8. The image capturing device according to claim 1, further comprising
a determiner, operable to determine the predetermined time period based on the object image;
a switch; and
a controller, operable to cause the determiner to determine the predetermined time period after the switch is operated.

9. An image capturing method comprising:
performing a first image capturing of an object image so as to generate first image data corresponding to a first time period shorter than a predetermined time period, the first time period being defined from a first time point to a second time point;
performing a second image capturing of the object image so as to generate second image data corresponding to a second time period shorter than the predetermined time period after the first image capturing, the second time period being defined from a third time point to a fourth time point;
detecting movement of an image capturer and generating movement data based on the detected movement;
generating third image data by superposing the first image data and the second image data based on the movement data corresponding to a third time period defined between the first time point and the third time point; and
generating the image data based on the third image data.

* * * * *